United States Patent [19]

Thomey

[11] Patent Number: 4,551,120
[45] Date of Patent: Nov. 5, 1985

[54] BELT TENSIONER

[75] Inventor: Henry W. Thomey, Windsor, Canada

[73] Assignee: Dyneer Corporation, Westport, Conn.

[21] Appl. No.: 598,837

[22] Filed: Apr. 10, 1984

[51] Int. Cl.[4] .............................................. F16H 7/12
[52] U.S. Cl. ................................... 474/135; 474/112; 474/115
[58] Field of Search ............... 474/112, 115, 101, 133, 474/135

[56] References Cited

U.S. PATENT DOCUMENTS

| | | |
|---|---|---|
| 4,285,676 | 8/1981 | Kraft .................................. 474/135 |
| 4,299,584 | 11/1981 | Sproul . | 
| 4,362,525 | 12/1982 | Sproul . |
| 4,473,362 | 9/1984 | Thomey et al. ..................... 474/135 |

Primary Examiner—Stephen J. Novosad
Assistant Examiner—Bruce M. Kisliuk
Attorney, Agent, or Firm—Michael Sand Co.

[57] ABSTRACT

A device for maintaining a constant tension on an endless drive belt which supplies power to and drives the vehicle accessories. A mounting bracket is adapted to be mounted on an engine in a stationary position adjacent the drive belt and has an idler pulley rotatably mounted on an end of a lever. The lever is pivotally mounted on a shaft which extends outwardly from the mounting bracket. A torsional coil spring biases the idler pulley into tensioning engagement with the drive belt. The pulley is mounted on a stub shaft which extends parallel with the pivot shaft and is formed with an outer annular belt engaging surface. The pivot shaft is located within the periphery of the pulley belt engaging surface and the radial center line of said belt engaging surface intersects the bearing surface of the pivot shaft to provide a compact, low friction belt tensioner. A brake band is mounted between and is cammingly engaged with the mounting bracket and idler pulley lever to provide a damping force therebetween retarding movement of the idler pulley in a non belt tensioning direction.

12 Claims, 14 Drawing Figures

U.S. Patent  Nov. 5, 1985  Sheet 1 of 3  4,551,120
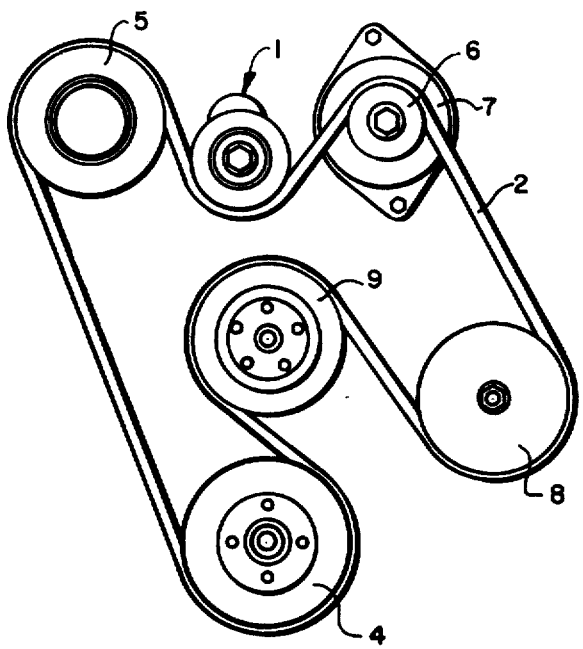
FIG. 1
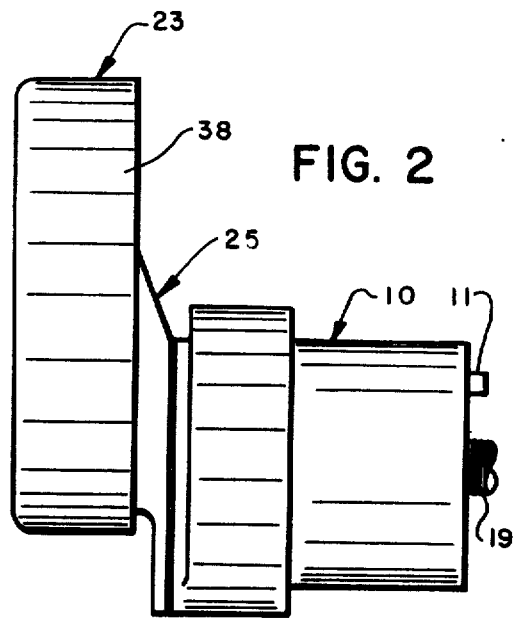
FIG. 2
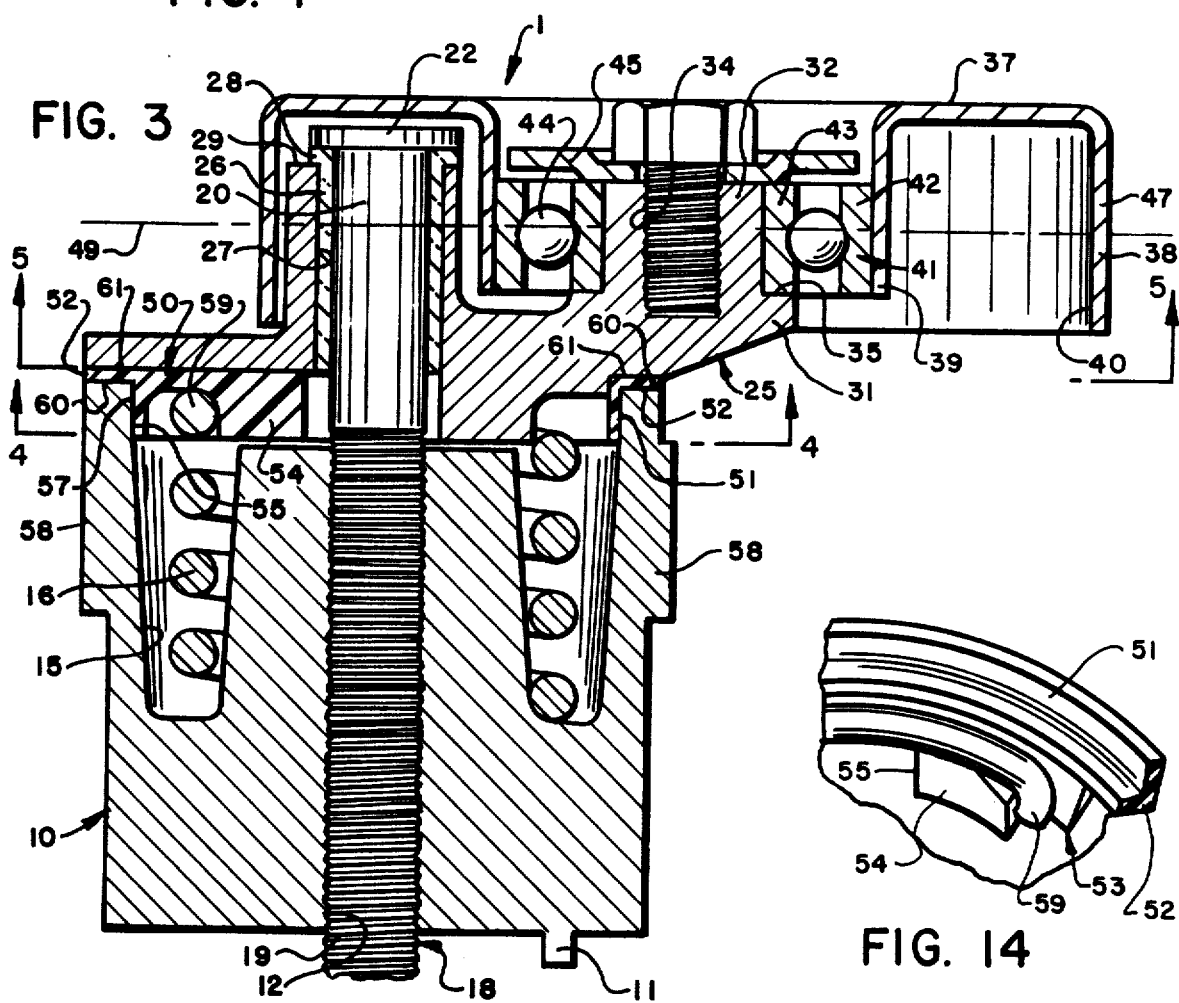
FIG. 3
FIG. 14

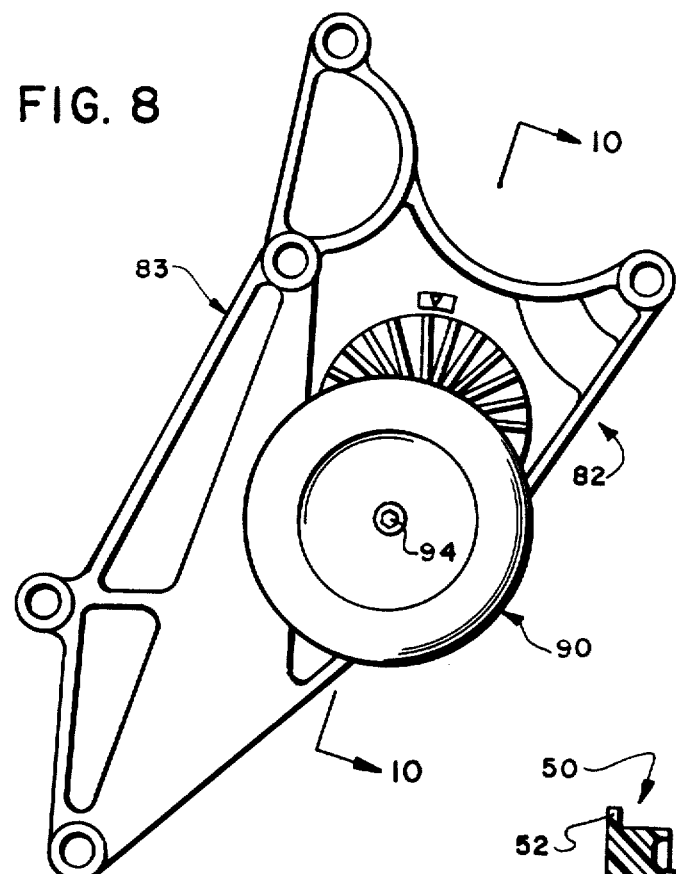
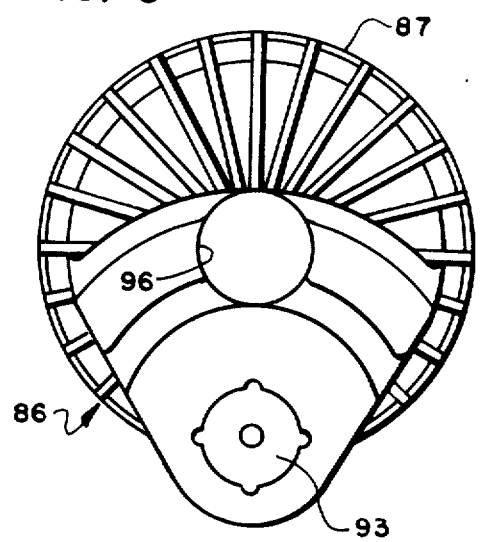
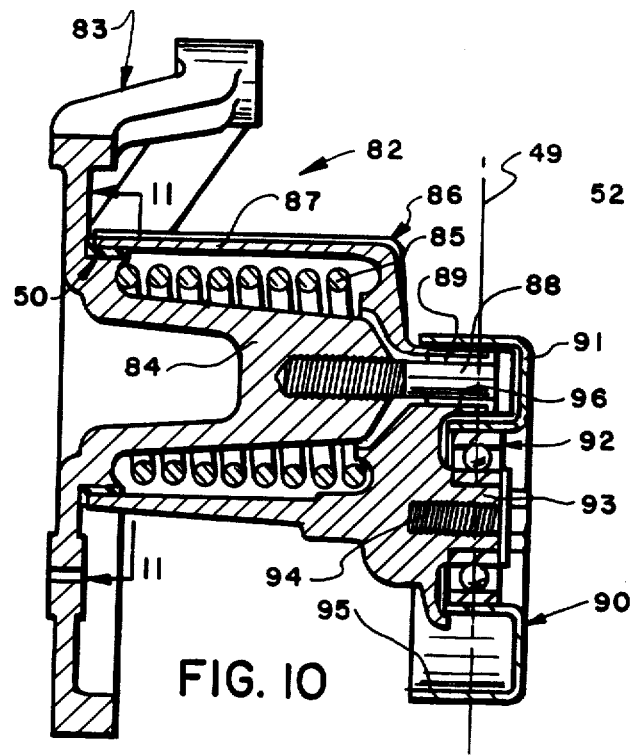
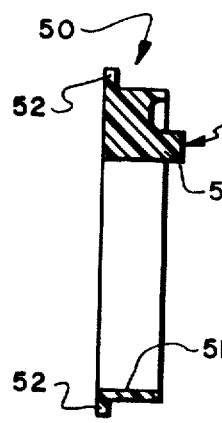
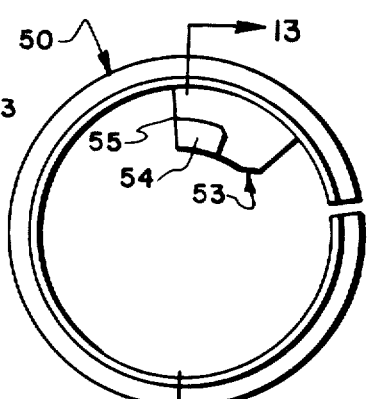

BELT TENSIONER

TECHNICAL FIELD

The invention relates to belt tensioning devices and in particular to spring biased belt tensioners for use with endless drive belts of the drive systems for vehicle accessories. More particularly, the invention relates to an extremely simple and inexpensive belt tensioner operated by a torsional spring in which the pivot bearing for the pivotally mounted lever on which the belt engaging idler pulley is rotatably mounted, is located within the periphery of the belt engaging surface of the pulley.

BACKGROUND ART

There is a trend today in the automobile industry to operate the various accessories, such as the power steering pump, oil and air pumps, air conditioning and alternator, by a single endless belt driven by a pulley connected to the engine crank-shaft. This system is referred to as a "serpentine" drive belt system. To ensure optimum operating efficiency for these various accessories, it is necessary that the drive belt be maintained at a predetermined tension to assure efficient performance of the accessories as well as satisfactory service life for the belt. Due to the relatively greater length for the single drive belt which replaces the heretofore plurality of smaller belts, there is a greater tendency for the belt to stretch which will affect the operating characteristics of the driven accessories. Therefore, it is desirable that a belt tensioning device be used for these endless belts to provide reliable service over an extended period of time and to maintain a constant amount of tension thereon regardless of the amount of belt stretch.

Numerous devices have been proposed and used to accomplish this purpose. One type of tensioner uses a bushing formed of an elastomeric material which is placed in compression by some mechanical means for continuously exerting a tensioning force on the belt. Examples of these constructions are shown in U.S. Pat. Nos. 3,975,965 and 4,144,772. These tensioning constructions, which use an elastomeric material, have the disadvantages in that the high rate which they exert on the belt results in the rapid loss of tensioning as the belt stretches, and this load rate limits the stroke of the belt engaged idler pulley to a shorter distance than desired. Also, sudden acceleration and deceleration of the drive belt can cause a whipping action to occur which causes excessively high or low tensioning values.

Numerous other types of belt tensioning devices use coil springs which are either in compression or tension, for applying and maintaining the tensioning force on a belt-engaging idler pulley or chain-engaging idler pulley or chain-engaging sprocket. Some examples of these types of constructions are shown in U.S. Pat. Nos. 2,703,019, 2,893,255, 3,413,866, 3,483,763, 3,631,734, 3,768,324, 3,812,733, 3,924,483, 3,965,768 and 4,108,013. Some of these various coil spring-actuated devices use the biasing force of a spring in combination with hydraulic-actuated members for regulating the amount of tensioning force applied to the belt, depending on whether the engine is running or shut off. Examples of these combination spring and hydraulic belt tensioners are shown in U.S. Pat. Nos. 2,051,488, 3,142,193 and 4,077,272.

Other types of tensioning devices and arrangements are provided with some type of mechanical retaining means, usually a ratchet-pawl retaining mechanism, which limits the movement of the belt tensioning member in an opposite nontensioning direction, thereby maintaining a constant tensioning force on the endless drive belt and eliminating the undesirable effects of belt whipping. Examples of these prior constructions and arrangements having such retaining mechanisms are shown in U.S. Pat. Nos. 2,051,488, 2,703,019, 3,413,866, 3,631,734 and 3,812,733.

Other known belt tensioner constructions, such as shown in U.S. Pat. No. 3,924,483, use a torsional spring for pivotally moving one of the vehicle accessories to achieve the desired tensioning force. Other constructions, such as shown in U.S. Pat. Nos. 3,136,170, 3,483,763, 3,834,246, and 4,285,676, use a torsional coil spring for pivotally moving a lever and idler pulley into belt tensioning engagement which provides a relatively simple, economical and compact unit.

It is desirable that a belt tensioner be provided with some type of damping means to prevent excessive oscillation from occurring in the spring tensioning member, and which will absorb sudden shocks to prevent a whipping action from occurring in the tensioner and drive belt. This damping action is especially critical when a coil spring is used for applying the belt tensioning force since coil springs are highly susceptible to developing natural oscillating frequencies when the counter force, which is exerted thereon by the belt, fluctuates during acceleration action affects the efficiency of the tensioning force applied to the belt by the coil spring and reduces belt life. Furthermore, without sufficient damping the tensioner may vibrate which will shorten considerably the life of the drive belt. Also, energy which is absorbed by the belt is imparted to the tensioner and will cause this undesirable vibration and spring harmonies unless damping is provided. Also, damping will prevent noise from occuring in the tensioner caused by the spring harmonies and tensioner vibrations.

Various damping devices have been used with belt tensioners to eliminate or reduce this problem of coil spring oscillation. One type of construction uses a hydraulic fluid as the damping means, such as shown in U.S. Pat. Nos. 2,893,255, 3,964,311, 3,986,407 and British Pat. No. 336,737. U.S. Pat. No. 3,710,634 shows a belt tensioner which uses an eccentrically mounted mechanical pinion and rack arrangement which is spring biased by a leaf spring for absorbing an excessive amount of shock as opposed to providing a damping action for spring-biased belt tensioning plunger.

It also is highly desirable when developing a belt tensioner intended primarily for use on an automobile to devise a construction which can be produced as inexpensively as possible without sacrificing durability and efficiency since a savings of only a part of a dollar would amount to a sufficient overall savings when considering the millions of vehicles that are produced by the various vehicle manufacturers.

Another problem that occasionally occurs with belt tensioners is bearing failure such as the bearing ring which rotatably mounts the idler pulley on the pivotally mounted lever as well as the bearing which pivotally mounts the lever on its shaft which is mounted on the engine or engine bracket. The lever of many belt tensioners is pivotally mounted by a bushing sleeve formed of bronze or similar friction reducing material. Due to the unbalanced force components that are exerted of the idler pulley with respect to the bushing sleeve, the sleeve bushing has to be relatively long in axial length in order to distribute the unbalanced forces along the length of the sleeve. It is desirable that the length of this bushing sleeve be as short as possible to reduce the overall size of the tensioner as well as providing versatility for mounting it on various engine configurations in addition to increasing bearing life. Therefore, the need has existed for such a belt tensioner having an improved mounting arrangement of the idler pulley with respect to the tensioning lever pivot shaft which increases bearing life, which may include damping means, and which reduces the friction forces exerted on the pivot bushing of the lever means by aligning the belt engaging idler pulley with the bushing center line.

DISCLOSURE OF THE INVENTION

Objectives of the invention include providing an improved device for tensioning the drive belt for vehicle accessories which maintains a generally constant predetermined tensioning force on the belt throughout the life of the belt regardless of whether the engine is on or off or operating at various speeds and conditions, and regardless of the tensioning position of the belt engaging idler pulley in its tensioning movement range.

Another objective is to provide such a tensioning device which is of a relatively inexpensive design formed of sheet metal components which can be mass produced by simple metal stamping procedures and then assembled with a usual pulley and torsional spring, and in which the radial center line of the belt engaging idler pulley groove is aligned with the radial center line of the bushing on which the idler lever mounting arm is pivotally mounted thereby reducing the unbalanced frictional force component heretofore exerted on the pivot bushing increasing the life and operating efficiency of the tensioner.

Still another objective is to provide such a tensioning device having an improved damping mechanism consisting of a split ring of plastic material which is mounted between a fixed engine mounting bracket and a pivotally mounted lever arm, in which the damping ring is moved into frictional engagement with the lever arm by mutually engaged camming surfaces formed on the damping ring and mounting plate retarding movement of the lever arm in both belt tensioning and non belt tensioning directions; in which the damping ring is biased into frictional engagement with the lever arm by the same torsional coil spring which provides the tensioning force on the lever arm thereby ensuring that the amount of damping is proportional to the torque of the spring which achieves a highly efficient damping action which is a function of the tensioner span geometry.

Another very important objective is to provide such an improved belt tensioner in which the frictional force exerted against the lever arm pivot bushing is reduced considerably by locating the pivot bushing within the periphery of the belt engaging surface of the idler pulley. Likewise it is desirable that the belt tensioner provide a relatively large circumferential belt wrap with a short moment arm between the idler pulley mounting shaft and the pivot shaft on which the idler pulley lever arm is pivotally mounted. A further objective is to provide such a tensioning device which achieves the stated objectives in a simple, effective, rugged and relatively inexpensive manner, and which solves the problems and satisfies need existing in the art.

These objectives and advantages are obtained by the improved belt tensioner construction for automatically tensioning an endless drive belt of a drive system for vehicle engine accessories, the general nature of which may be stated as including: a bracket adapted to be mounted on a vehicle engine adjacent the drive belt; a shaft mounted on the bracket; lever means pivotally mounted on the shaft and extending generally radially outwardly from the shaft for pivotal movement toward and away from the drive belt; spring means biasing the lever means in the belt tensioning direction; and a pulley rotatably mounted on the lever means and engageable with the drive belt for applying a tensioning force on said belt when the lever means is biased by the spring means in a belt tensioning direction toward the drive belt, with the lever means shaft lying within the periphery of the pulley.

BRIEF DESCRIPTION OF THE DRAWINGS

Preferred embodiments of the invention, illustrative of the best mode in which applicant has contemplated applying the principles, are set forth in the following description and shown in the accompanying drawings and are particularly and distinctly pointed out and set forth in the appended claims.

FIG. 1 is a diagrammatic view looking toward the front of a vehicle engine illustrating an endless drive belt operatively connected to and driving the vehicle accessories, with the improved belt tensioner being shown in tensioning engagement with the drive belt;

FIG. 2 is an end elevational view of the improved belt tensioner of FIG. 1;

FIG. 3 is an enlarged longitudinal sectional view of the improved belt tensioner;

FIG. 8 is a front elevational view of another form of the improved belt tensioner;

FIG. 9 is an enlarged front elevational view of the lever arm portion of the improved belt tensioner of FIG. 8 shown removed from the mounting plate and with the idler pulley removed;

FIG. 10 is an enlarged sectional view taken on line 10—10, FIG. 8;

FIG. 11 is a sectional view taken on line 11—11, FIG. 10;

FIG. 12 is a reduced plan view of the brake band ring removed from the belt tensioner as shown in FIG. 3;

FIG. 13 is a sectional view taken on line 13—13, FIG. 12; and

FIG. 14 is a fragmentary diagrammatic perspective view showing the engagement between the tensioner coil spring and brake band ring of the belt tensioner of FIG. 3.

Similar numerals refer to similar parts throughout the drawings.

BEST MODE FOR CARRYING OUT THE INVENTION

Figure 4:
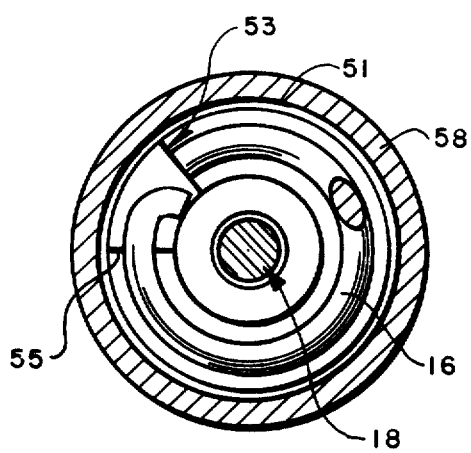
FIG. 4 is a reduced sectional view taken on line 4—4, FIG. 3.
Figure 5:
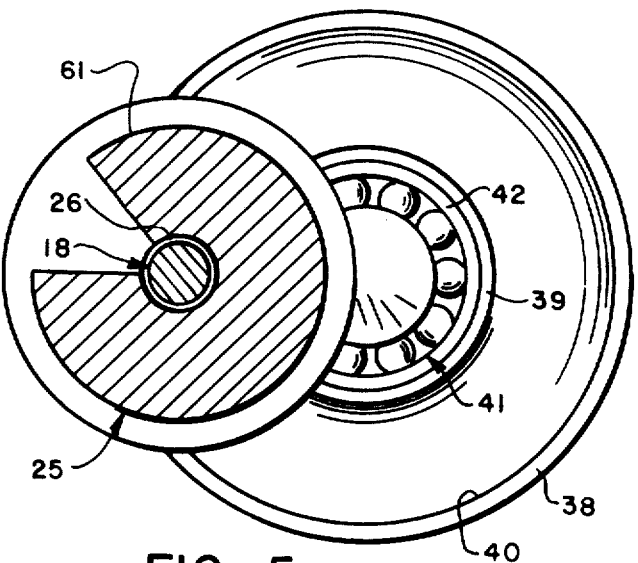
FIG. 5 is a reduced sectional view taken on line 5—5, FIG. 3.

Referring to FIG. 1 of the drawings, the improved belt tensioner construction is indicated generally at 1, and is shown in tensioning engagement with an endless drive belt 2 of a belt drive system for the vehicle accessories. The drive system consists of a plurality of belt pulleys or sheaves having configurations and diameters determined by their associated engine accessory components and locations relative to each other. The various pulleys are supported on their respective engine components, which in turn are mounted on an engine (not shown) in a usual manner known in the art. Preferably, belt 2 operates in a single vertical plane on the engine to eliminate binding and skewing of the belt.

The engine accessories drive system, as shown in FIG. 1, consists of a main driving pulley 4 which is operatively connected to the main drive shaft of the engine, a pulley 5 which is operatively connected to the air conditioning motor, a pulley 6 which is operatively connected to an alternator 7 which provides the electrical power for the engine, a pulley 8 which is operatively connected to the engine air pump, and a pulley 9 which is operatively connected to the engine water pump. This engine accessory configuration is by way of example only and may vary depending upon the particular vehicle engine and manufacturer thereof.

Tensioner 1 as shown particularly in FIG. 3 includes a mounting bracket indicated generally at 10, which may have a circular configuration as shown, and which is provided with a locating tab 11 and a threaded opening 12 through which a threaded shaft indicated generally at 18, extends for mounting bracket 10 on an engine. An annular groove 15 is formed in the upper end of bracket 10 for receiving a torsional coil spring 16 therein. Shaft 18 which has a threaded end 19 and a smooth cylindrical upper end 20 is mounted within a threaded opening 12 formed in bracket 10. The outer end of shaft 18 has a discshaped head 22 formed thereon, which extends radially beyond smooth end 20.

A lever indicated generally at 25, is pivotally mounted on shaft end 20 by a sleeve bushing 26 which is telescopically mounted on shaft end 20 and is seated in a cylindrical opening 27 formed in lever 25. Sleeve 26 terminates in a top annular flange 28 which abuts against the top annular surface 29 which surrounds lever opening 27 and abuts against discshaped head 22 of shaft 18. Bushing 26 preferably will be press fitted into opening 27.

Lever 25 will include an outwardly extending arm portion 31 which terminates in a stub shaft 32 on which an idler pulley indicated generally at 33, is rotatably mounted. Stub shaft 32 is formed with a threaded central opening 34 and is surrounded by an annular shoulder 35. Pulley 33 preferably is formed of stamped sheet steel and has an annular configuration with an inverted U-shaped cross sectional configuration defined by an annular end wall 37, a cylindrical outer wall 38 and a cylindrical inner wall 39. Walls 38 and 39 preferably are parallel with respect to each other and form a ringlike opening or area 40 therebetween.

A usual ball bearing ring 41 rotatably mounts pulley 33 on stub shaft 32 and includes an outer race 42 which is secured to inner wall 39 and an inner race 43 which is secured to stub shaft 32 and seated on annular shoulder 35. Races 42 and 43 are separated by bearing balls 44. A retaining washer 45 is clamped against bearing ring 41 by a locking bolt 46 to retain ring 41 on stub shaft shoulder 35.

In accordance with one of the main features of the invention, idler pulley 33 is mounted on lever 25 whereby pivot shaft 18 of lever 25 is located within annular opening 40 between pulley walls 38 and 39 as shown in FIG. 3. This mounting arrangement reduces considerably the friction and unbalanced frictional torque exerted in pivot bushing 26 and lever shaft 18. This enables a smaller pivot bushing to be used than in prior belt tensioner constructions in which the idler pulley lever shaft is located externally of the periphery of the idler pulley. Also with this mounting arrangement, the radial center line through the belt engaging surface 47 of outer wall 38, as shown by dotdash lines 49 in FIG. 3, intersects pivot bushing 26 providing this reduced frictional component and moment arm enabling a smaller pivot bushing to be used than heretofore possible.

In accordance with another feature of the invention, a brake band damping device indicated generally at 50, is mounted between and is operatively engaged with mounting bracket 10 and lever 25 to retard the pivotal movement of lever 25 and correspondingly of pulley 33 in both a tensioning and non belt tensioning directions. Brake band 50 is shown particularly in FIGS. 3, 4, 12 and 13 and has an annular split ring configuration, L-shaped in cross section with a main vertical leg 51 and a transverse secondary leg 52 extending radially outwardly from one end of leg 51. A projection indicated generally at 53 is formed integrally with ring leg 51 and extends inwardly toward the center of the ring as shown particularly in FIG. 12. Projection 53 includes a spring retaining lug 54 and a camming surface 55.

The operation of brake band 50 is described in greater detail in my copending application Ser. No. 598,043 filed Apr. 9, 1984 and is described briefly below. Torsional spring 16 biases camming surface 55 into a sloped surface 57 that is formed on the interior of annular wall 58 of mounting bracket 10 which forms annular groove 15 of bracket 10 as shown particularly in FIG. 4. When brake band 50 is assembled with mounting bracket 10 and lever 25, brake band camming surface 55 will lie within annular wall 58 of the base of mounting bracket 10 with lug camming surface 55 of brake band 50 slidably engaged with camming surface 57 of bracket 10. Spring end 59 of coil spring 16 is bent around spring retaining lug 54 and biases camming surface 55 into engagement with surface 57 of mounting bracket 10. Upstanding leg 51 of brake band 50 will lie in abutting engagement with an outer end portion of annular wall 58 of mounting bracket 10 throughout the remaining periphery of bracket 10 with the secondary leg 52 engaging the annular edge surface 60 of mounting bracket wall 58 and an annular surface 61 of lever 25.

Spring 16 biases brake band 50 into engagement with lever 25 retarding movement of lever 25 both in the belt tensioning direction and particularly in the non belt tensioning direction. Since torsional spring 16 provides both the tensioning force for pivotally moving lever 25 in a belt tensioning direction as well as the force for moving brake band 50 along the camming surface and into engagement with the lever means, this ensures that the amount of damping is proportional to the belt tensioning force and the geometry requirement. This provides a uniform damping throughout the tensioning range of the tensioning spring of tensioner 1.

However, brake band 50 provides merely one type of damping that can be used with improved belt tensioner 1 since the main and novel feature thereof is the location of lever shaft 18 and its pivotal mounting bearing 26 within the periphery or circumference of belt engaging wall 38 of idler pulley 33.

Figure 7:
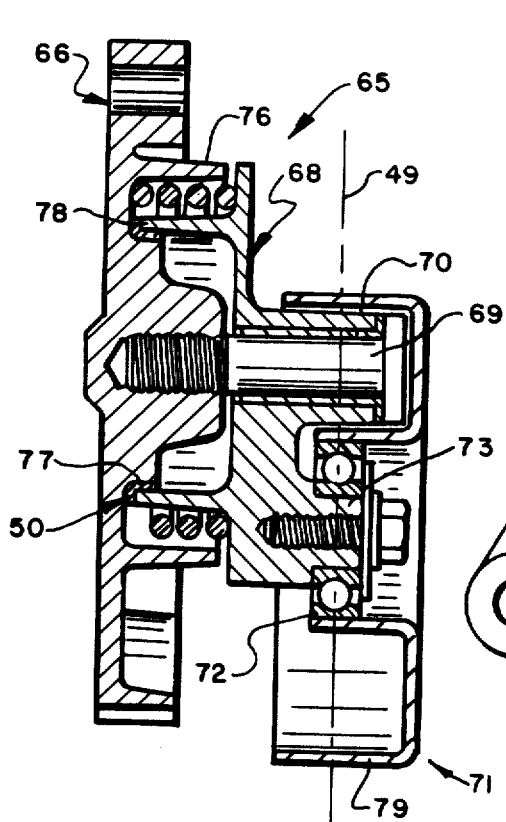
FIG. 7 is a sectional view taken on line 7—7, FIG. 6.
Figure 6:
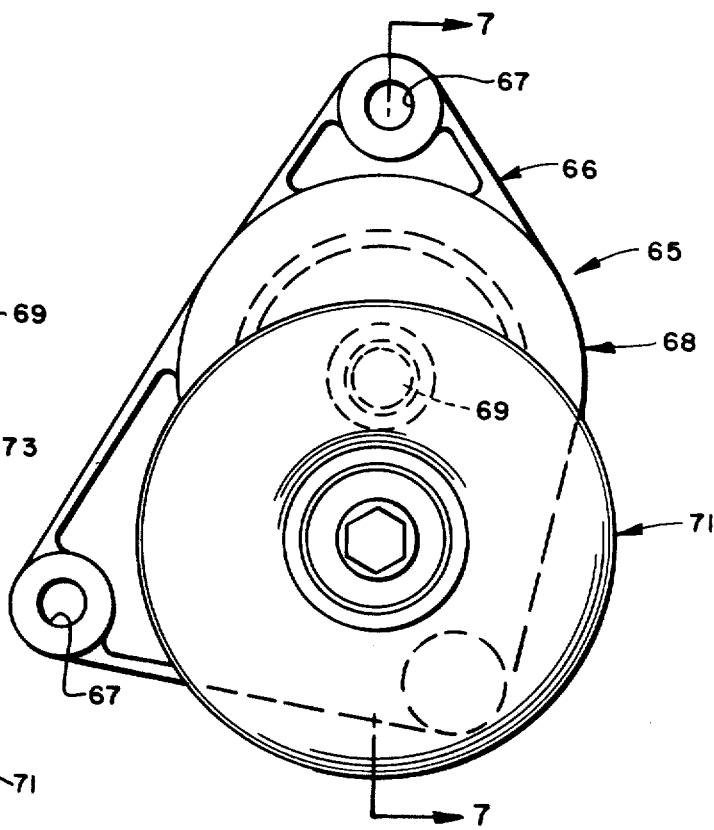
FIG. 6 is a front elevational view of a modified form of the improved belt tensioner.

A modified form of the improved belt tensioner is indicated generally at 65 and is shown in FIGS. 6 and 7. Modified tensioner 65 includes a mounting plate 66 having a generally triangular configuration which is adapted to be mounted on the vehicle engine by a plurality of bolts (not shown) which project through bolt receiving holes 67 formed at the corners of plate 66. Modified tensioner 65 includes a lever indicated generally at 68, which is pivotally mounted on a shaft 69 by means of a bearing bushing 70. An idler pulley 71 similar to pulley 33 of belt tensioner 1, is rotatably mounted by a bearing ring 72 on a stub shaft 73. The main difference between modified belt tensioner 65 and belt tensioner 1 is that lever 68 is formed with an annular wall 75 around which a torsional spring 76 is telescopically mounted and in which brake band 50 is telescopically mounted on an annular wall portion 77 of mounting bracket 66 and is biased into camming engagement with an outer annular edge 78 of wall 75 by spring 76. Brake band 50 is biased into engagement with annular wall 75 of lever 68 to retard movement of the lever in the belt tensioning and non tensioning directions. Again, in modified belt tensioner 65 as in tensioner 1, lever pivot shaft 69 is located within the periphery or circumference of the outer annular wall 79 with which accessory drive belt 2 is engaged. Also, the axis of idler pulley stub shaft 73 is parallel with the axis of lever shaft 69, and imaginary radial line 49 passes generally through the center of belt engaging surface 49, ball bearing ring 72 and pivot bushing 70.

Another embodiment of the improved belt tensioner is indicated generally at 82, and is shown particularly in FIGS. 8, 9, 10 and 11. Modified tensioner 82 includes an irregular shaped mounting bracket 83 which includes an outwardly extending annular projection 84 (FIG. 10) about which a torsional spring 85 is telescopically mounted. One end of spring 85 is connected to a lever indicated generally at 86, with the other spring end being operatively connected to brake band 50. Lever 86 includes a cylindrical housing formed by cylindrical side wall 87 and is rotatably mounted about annular projection 84 by a pivot shaft 88 and bearing bushing 89 located within an opening 96 formed in lever 86.

An idler pulley indicated generally at 90, is rotatably mounted on lever 86 and includes a stamped steel idler pulley housing 91 rotatably mounted by a bearing ring 92 on a shaft 93. Shaft 93 is attached to lever 86 by a mounting bolt 94. Again, modified belt tensioner 82 has the lever pivot shaft 88 located within the periphery of the circumferential belt engaging wall 95 of idler pulley assembly 90.

Modified belt tensioner 82 also has the damping feature incorporated therein in which brake band 50 (FIG. 11) is biased by torsional spring 85 into a camming engagement between projection 84 of mounting bracket 83 and cylindrical housing side wall 87 to retard movement of lever 86 in the tensioning and non belt tensioning directions. This construction provides a damping action directly proportional to the torque exerted by torsion spring 85 since torsion spring 85 provides both the tensioning force for moving idler pulley 91 into tensioning engagement with the drive belt in addition to providing the damping force between the pivotally mounted lever and its mounting bracket.

Idler pulleys 1, 65, and 82 all include the main feature of the invention, that is the location of the lever pivot shaft within the periphery of the outer belt engaging surface of the idler pulley which is rotatably mounted on another shaft attached to and movable with the lever, and in which the idler pulley shaft is spaced from and parallel with the pivot shaft of the lever assembly. These three embodiments further include the feature that an imaginary plane passing radially through the center of the belt engaging surface of the idler pulley also passes through the sleeve bushing which pivotally mounts the lever on the lever shaft. Preferably, this imaginary line passes generally through the midpoint of the lever shaft bushing and through the center of the bearing ring which rotationally mounts the idler pulley on its shaft. With this arrangement, it reduces the size of the lever mounting bushing heretofore required since the force applied to the lever bushing is generally equal to the force applied to the idler pulley in contrast to the prior art constructions wherein offsets exist between the pivot bushing and belt surface of the idler pulley which increases the pivot bearing loads. This provides for a lower cost unit which is more efficient and has a longer bearing life due to the reduction of the frictional forces and unbalanced torque components heretofore exerted thereon. The improved belt tensioner embodiments furthermore may be provided with the improved damping brake band ring of the type shown in the drawings and described briefly above.

Although the above description pertains to a tensioner for an endless belt of a vehicle accessory drive system, it need not be so limited since the principles of the invention are equally applicable for use on tensioner timing belts, chain drives, conveyor belts or other power transmission devices similar thereto.

Accordingly, the improved belt tensioner construction is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved belt tensioner is constructed and used, the characteristics of the construction, and the advantageous, new and useful results obtained; the new and useful structures, devices, elements, arrangements, parts, and combinations, are set forth in the appended claims.

What is claimed is:

1. A belt tensioner construction for automatically tensioning an endless drive belt of the drive system for vehicle accessories, said tensioner construction including:
    (a) a bracket adapted to be mounted on a vehicle engine adjacent the drive belt;
    (b) a shaft mounted on the bracket;
    (c) lever means pivotally mounted on the shaft and extending generally radially outwardly from the shaft for pivotal movement toward and away from the drive belt;
    (d) spring means biasing the lever means in the belt tensioning direction; and
    (e) pulley rotatably mounted on the lever means and engageable with the drive belt for applying a tensioning force on said belt when the lever means is biased by the spring means in a belt tensioning direction toward the drive belt, with an outer end of the shaft lying within the periphery of the pulley.

2. The belt tensioner defined in claim 1 in which the pulley is an idler pulley and includes an annular belt engaging wall which extends circumferentially about a stub shaft on which the pulley is rotatably mounted; and in which the shaft is parallel with and spaced from said stub shaft and is located within the circumference of the pulley defined by the annular belt engaging wall.

3. The belt tensioner defined in claim 2 in which a bearing rotatably mounts the idler pulley on the stub shaft; and in which a radial center line through the annular belt engaging wall extends approximately through a radial center of said bearing.

4. The belt tensioner defined in claim 2 in which a bearing rotatably mounts the lever means on the shaft; and in which a radial center line through the annular belt engaging wall intersects the bearing.

5. The belt tensioner defined in claim 1 in which the pulley includes an outer annular portion having an inverted U-shaped cross-sectional configuration which forms a ringlike opening; and in which the shaft extends into the ringlike opening of said inverted U-shaped outer annular portion.

6. The belt tensioner defined in claim 1 in which the pulley includes an annular inverted U-shaped ring having spaced inner and outer cylindrical side walls connected an end wall forming an opening therebetween; in which the outer side wall is adapted to be engaged by the drive belt; in which first bearing means is mounted on the inner side wall for rotatably mounting the pulley on the lever means; and in which the second bearing means is mounted on the shaft for pivotally mounting the lever means thereon; and in which the shaft projects into the opening formed between said pulley side walls.

7. The belt tensioner defined in claim 6 in which the first bearing means is a roller bearing.

8. The belt tensioner defined in claim 6 in which the second bearing means is a sleeve bushing.

9. The belt tensioner defined in claim 1 in which brake band means is mounted between and engaged with the bracket and lever means for retarding pivotal movement of the lever means in a non belt tensioning direction.

10. The belt tensioner defined in claim 9 in which the spring means is a coil torsional spring telescopically mounted with respect to the shaft; and in which the spring biases the brake band means into camming engagement with the lever means.

11. The belt tensioner defined in claim 9 in which the brake band means includes a split annular ring formed with a radially inwardly extending projection; in which the spring means is engaged with said projection for biasing said ring into engagement with the lever means in addition to biasing the lever means in the belt tensioning direction.

12. A tensioner construction for automatically tensioning an endless power transmission device such as a belt, chain or the like, said tensioner construction including:
(a) bracket means for mounting the tensioner construction adjacent the power transmission device;
(b) a shaft having a longitudinal axis mounted on the bracket means;
(c) lever means pivotally mounted on the shaft and extending generally radially outwardly from the shaft for pivotal movement toward and away from the power transmission device;
(d) spring means biasing the lever means in the tensioning direction; and
(e) a pulley rotatably mounted on the lever means and engageable with the power transmission device for applying a tensioning force on said device when the lever means is biased by the spring means in a tensioning direction toward the device, with the longitudinal axis of the shaft projecting within the periphery of the pulley.

* * * * *

REEXAMINATION CERTIFICATE (1274th)
United States Patent [19]
Thomey

[11] B2 4,551,120
[45] Certificate Issued May 8, 1990

[54] BELT TENSIONER

[75] Inventor: Henry W. Thomey, Windsor, Canada

[73] Assignee: New Dyneer Corporation

Reexamination Request:
No. 90/001,786, Jun. 12, 1989

Reexamination Certificate for:
Patent No.: 4,551,120
Issued: Nov. 5, 1985
Appl. No.: 598,837
Filed: Apr. 10, 1984

Reexamination Certificate B1 4,551,120 issued Jul. 25, 1989.

[51] Int. Cl.⁵ ............................................. F16H 7/12
[52] U.S. Cl. ................................. 474/135; 474/112; 474/115
[58] Field of Search ............... 474/112, 115, 101, 133, 474/135

[56] References Cited

U.S. PATENT DOCUMENTS

| | | | |
|---|---|---|---|
| 1,902,980 | 3/1933 | Wilhelm . | |
| 2,051,488 | 8/1936 | Kothowski et al. | 74/242.11 |
| 2,258,465 | 10/1941 | Mullaney | 74/242.11 |
| 4,077,272 | 3/1978 | Busso . | |
| 4,270,906 | 6/1981 | Kraft et al. | 474/135 |
| 4,285,676 | 8/1981 | Kraft | 474/135 |
| 4,472,162 | 9/1984 | Hitchcock | 474/135 |
| 4,473,362 | 9/1984 | Thomey et al. | 474/135 |
| 4,504,252 | 3/1985 | Homma | 474/112 |
| 4,557,707 | 12/1985 | Thomey | 474/101 |
| 4,605,387 | 8/1986 | Okubo et al. | 474/112 |

FOREIGN PATENT DOCUMENTS

| | | |
|---|---|---|
| 3214231 | 11/1983 | Fed. Rep. of Germany . |
| 8330695 | 1/1984 | Fed. Rep. of Germany . |
| 58-65453 | 5/1983 | Japan . |
| 232291 | of 1925 | United Kingdom . |
| 295532 | of 1928 | United Kingdom . |
| 1412222 | 10/1975 | United Kingdom . |

OTHER PUBLICATIONS

Dietrych et al., "Podstawy Konstrukcji Maszyn", 1970, pp. 411-414 (with translation).

*Primary Examiner*—Bruce M. Kisliuk

[57] ABSTRACT

A device for maintaining a constant tension on an endless drive belt which supplies power to and drives the vehicle accessories. A mounting bracket is adapted to be mounted on an engine in a stationary position adjacent the drive belt and has an idler pulley rotatably mounted on an end of a lever. The lever is pivotally mounted on a shaft which extends outwardly from the mounting bracket. A torsional coil spring biases the idler pulley into tensioning engagement with the drive belt. The pulley is mounted on a stub shaft which extends parallel with the pivot shaft and is formed with an outer annular belt engaging surface. The pivot shaft is located within the periphery of the pulley belt engaging surface and the radial center line of said belt engaging surface intersects the bearing surface of the pivot shaft to provide a compact, low friction belt tensioner. A brake band is mounted between and is cammingly engaged with the mounting bracket and idler pulley lever to provide a damping force therebetween retarding movement of the idler pulley in a non belt tensioning direction.

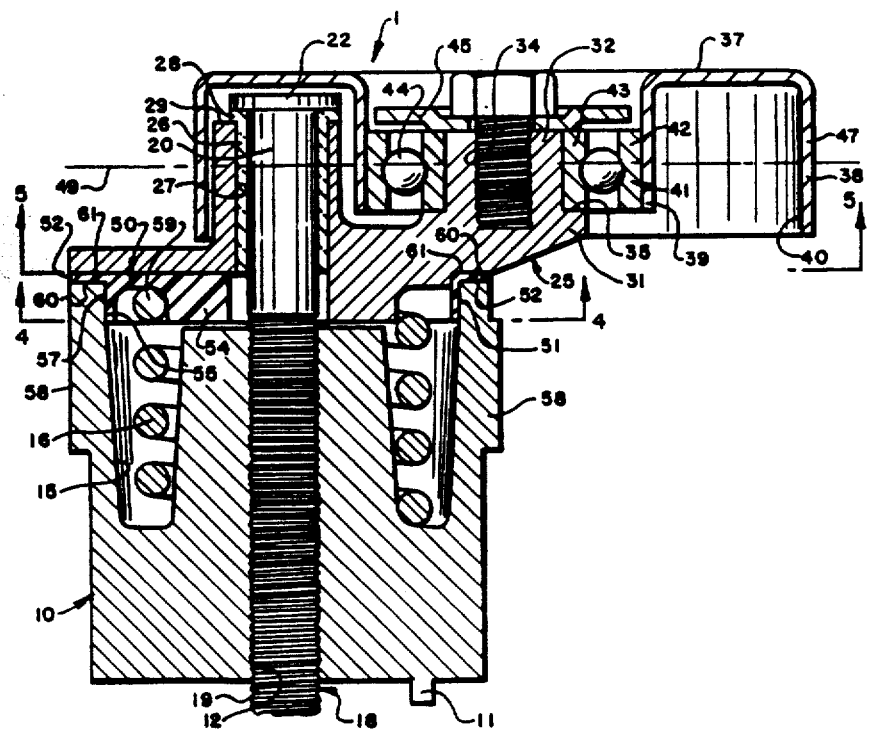

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1, 5–8, 10, 11, 15 and 16 is confirmed.

Claims 2–4 and 9 were previously cancelled.

Claims 12, 17 and 18 are determined to be patentable as amended.

Claims 13 and 14, dependent on an amended claim, are determined to be patentable.

12. A tensioner construction for automatically tensioning an endless power transmission device such as a belt, chain or the like, said tensioner construction including:
 (a) bracket means for mounting the tensioner construction adjacent the power transmission device;
 (b) a shaft having a longitudinal axis mounted on the bracket means;
 (c) lever means pivotally mounted on the shaft and extending generally radially outwardly from the shaft for pivotal movement toward and away from the power transmission device;
 (d) spring means biasing the lever means in the tensioning direction; and
 (e) a pulley having a belt engageable wall and *which is* rotatably mounted on the lever means and engageable with the power transmission device for applying a tensioning force on said device when the lever means is biased by the spring means in a tensioning direction toward the device, with an outer end of the shaft projecting within the periphery of the pulley and with the pivotal mounting of the lever means being radially offset, *spaced from,* and generally parallel with the rotational mounting of the pulley, and with an imaginary line which passes through the [belt engaging] wall intersecting the pivotal mounting of the lever means and rotational mounting of the pulley substantially perpendicularly to reduce unbalanced frictional forces on the pivotal mounting of the lever means.

17. In a tensioner adapted for automatically tensioning an endless power transmission device such as a belt, chain or the like, said tensioner being of the type with a mounting bracket adapted to be mounted adjacent the power transmission device, a shaft mounted on the bracket, lever means extending generally radially outwardly from the shaft and pivotally mounted to move about a first axis of the shaft, spring means for biasing the lever means to pivot around the shaft, and a pulley rotatably mounted on the lever means to rotate about a second axis that is spaced from and substantially parallel to the first axis, and wherein the improvement comprises:
 (a) the pivotal mount of the lever means including an end portion of the shaft;
 (b) the pulley having (1) a belt engaging wall [that] *and which* is spaced from the second axis a radial distance that is greater than the spacing between the first and second [axis] *axes*, and (2) a periphery;
 (c) wherein a portion of the pivotal mount, a portion of the rotatable mount and a portion of the belt engaging wall substantially intersect a radial line substantially perpendicular to the shaft; [and]
 (d) wherein an outer end of the shaft lies within the periphery of the pulley[.]; *and*
 (e) *wherein the first axis is located radially outward of the rotatable mount in relation to the second axis.*

18. A belt tensioner construction for automatically tensioning an endless drive belt of the drive system for vehicle accessories, said tensioner construction including:
 (a) a bracket adapted to be mounted on a vehicle engine adjacent the drive belt;
 (b) a nonrotatable and gearless shaft mounted on the bracket;
 (c) lever means pivotally mounted on the shaft and extending generally radially outwardly from the shaft for pivotal movement toward and away from the drive belt;
 (d) spring means biasing the lever means in the belt tensioning direction; [and]
 (e) a pulley freely rotatably mounted on the lever means *to rotate about an axis* and engageable with the drive belt for applying a tensioning force on said belt when the lever means is biased by the spring means in a belt tensioning direction toward the drive belt, with an outer end of the shaft lying within the periphery of the pulley[.]; *and*
 (f) *wherein the shaft is located radially outward of the rotatable mount in relation to said axis.*

* * * * *